Feb. 21, 1939.    E. H. YONKERS, JR    2,148,389
SIGNALING SYSTEM AND METHOD
Filed Jan. 14, 1938    2 Sheets-Sheet 1
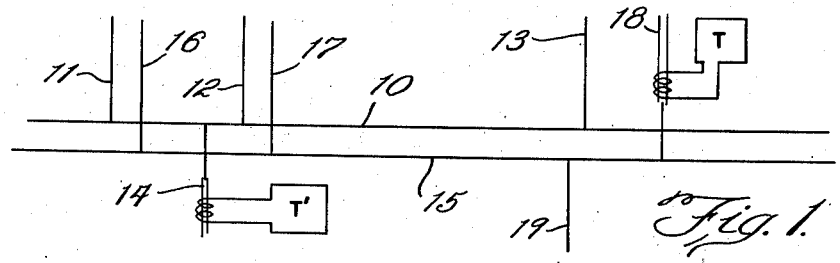
Fig. 1.
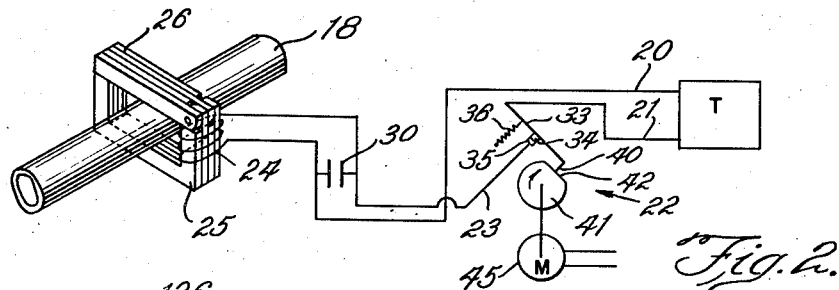
Fig. 2.
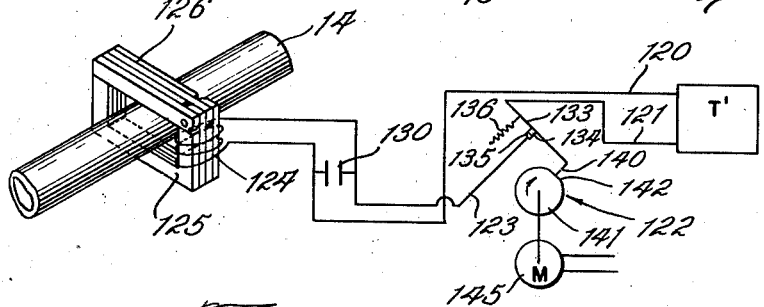
Fig. 3.
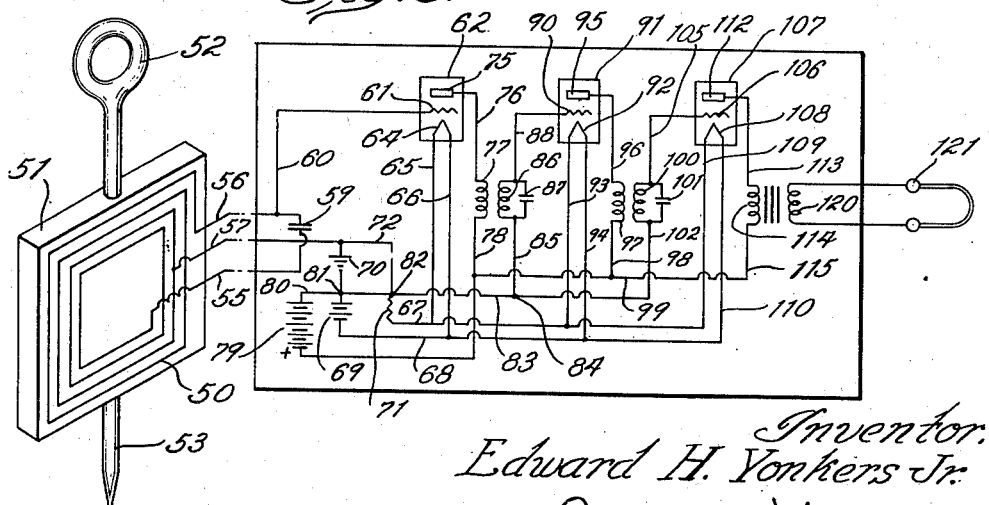
Inventor:
Edward H. Yonkers Jr.
By Robert L. Kahn Atty.

Feb. 21, 1939. E. H. YONKERS, JR 2,148,389
SIGNALING SYSTEM AND METHOD
Filed Jan. 14, 1938 2 Sheets-Sheet 2
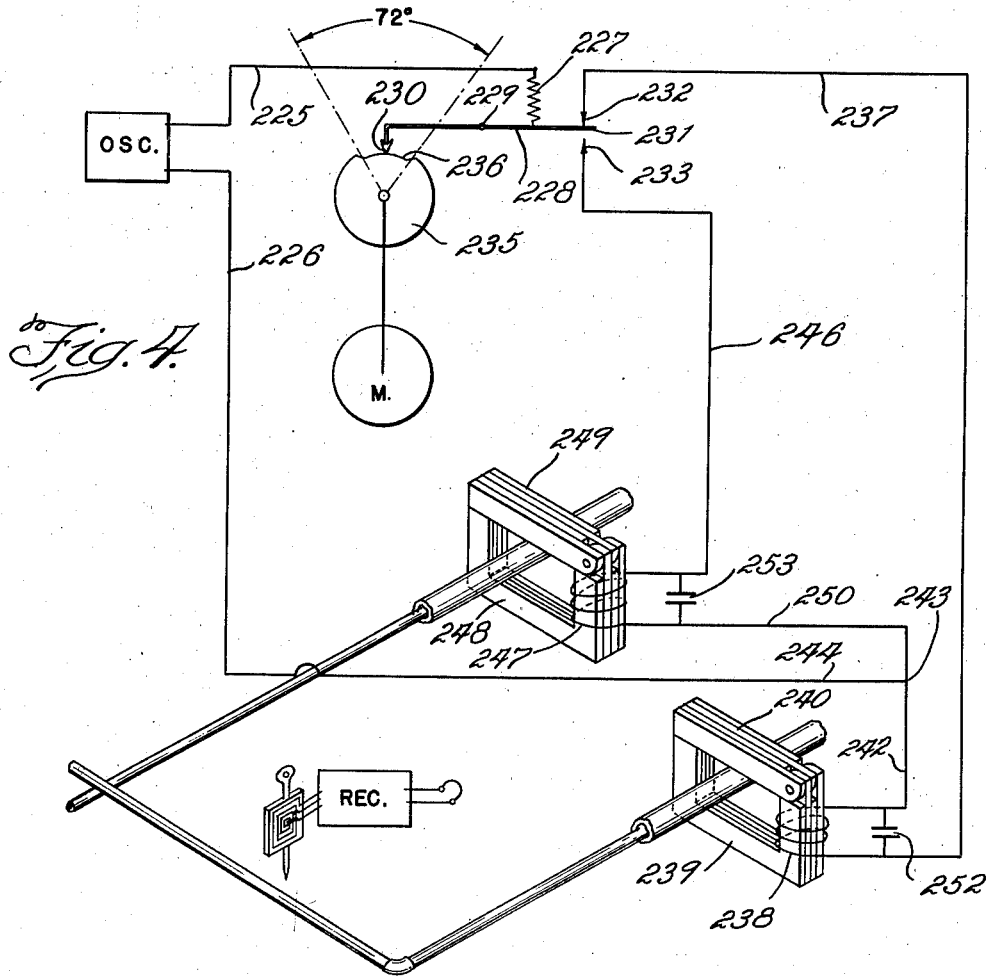
Fig. 4.
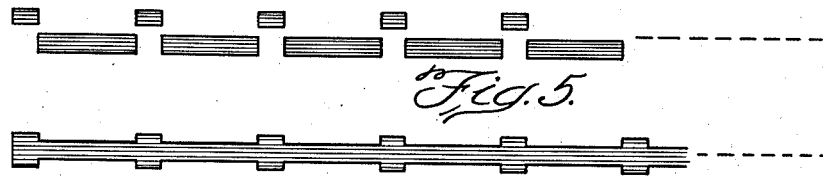
Fig. 5.
Fig. 6.
Fig. 7.
Inventor:
Edward H. Yonkers Jr.
By: Robert L. Kahn
Atty.

Patented Feb. 21, 1939

2,148,389

UNITED STATES PATENT OFFICE 2,148,389

SIGNALING SYSTEM AND METHOD

Edward H. Yonkers, Jr., Evanston, Ill., assignor to Joslyn Mfg. and Supply Co., Chicago, Ill., a corporation of Illinois Application January 14, 1938, Serial No. 184,955

16 Claims. (Cl. 175—183)

This invention relates to a signaling system and a method of signaling for use in connection with identifying one of a series of interlaced conducting pipe systems. In practically all cities, water and gas pipes are disposed below the street surfaces and more or less interlaced with each other as well as other conduits such as for telephones. It frequently occurs that precise layouts or maps of such systems either do not exist or are not convenient when one of the series of such pipe systems must be accurately located. It is obvious that haphazard tearing up of streets is expensive and time consuming so that a positive method of locating and tracing one of several interlaced pipe systems is of great utility.

While it is old to couple a source of electrical oscillations to a pipe system and attempt to trace such a system with a pick-up coil, it has been found, nevertheless, that such a method is far from being accurate. Thus, the water and gas piping are intimately connected to each other in the average house, such as by gas fired water heaters. With such interconnection, the pick-up coil may and often does trace out an undesired pipe or go from one system to the other as the two cross without any sensible appreciation of this on the part of the operator.

An object of this system and method is to distinguish the course of one pipe system from that of another pipe system.

In general this is accomplished by impressing on all the interlaced pipe system oscillations of the same frequency—preferably between 2000 and 3000 cycles per second. The energy level of these oscillations is changed to a discernibly different level with each level enduring for a sensible period of time. Thus signal impulses are created. It is understood of course that if one of the various levels of energy is zero that it may still be considered as a signal impulse of silence against a uniform noise level. These energy level variations are cyclical. An operator with a pick-up coil and receiver may then trace the path of maximum radiation above ground and thus outline the pipe system desired.

The preferred frequency range is chosen because it is high enough to give good radiation for pick-up above ground, is easily distinguished from 60 cycle power interference and is low enough so that undesirable cross coupling between various pipe systems is reduced. It is understood, however, that this range is illustrative only, and under special conditions may be disregarded.

In one form of the invention, each pipe system is equipped with an individual oscillator. The coupling to the system may be in a house where the pipe is exposed. Thus in this form, one oscillator may send out dot signals in comparison to dash signals sent out by another oscillator. In this form, more than two pipe systems may be operated upon by devising different signals.

In the preferred form, however, one oscillator is alternately switched from one pipe system to another for unequal time intervals. Each time interval represents a signal modulation. Since one oscillator is employed, undesirable heat effects are avoided. In this form, an operator quickly learns to distinguish one signal from the other even though he may hear them both.

By means of a pick-up coil and an amplifier, together with a conventional head phone, an operator can trace one system of pipes as distinguished from another system for a distance of several city blocks from the original source of oscillations of the system in question.

Referring to the drawings:

Figure 1 is a diagrammatic representation of a system of pipes with the various transmitters and pick-up coil.

Figure 2 is a view of each transmitter with the modulating means coupled to a pipe.

Figure 3 is a circuit diagram of the pick-up system.

Figure 4 shows a preferred form of the invention.

Figures 5–7 inclusive are sound energy level diagrams.

As shown in Figure 1, a system of pipes 10, which may be the gas mains, has a plurality of branches 11, 12, 13 and 14 going off into various houses and stores, and another system of pipes 15 which may be the water mains, has a plurality of branches 16, 17, 18 and 19. It is understood, of course, that these pipes, in practice, may and do cross each other at various points. As shown in this figure, an oscillator T is coupled to some branch, such as 18, of the water pipe system and another oscillator T' is coupled to a branch 14 of the gas system. In practice, the two transmitters may be disposed on opposite sides of the street or on the same side of the street at a short distance away. Each oscillator T and T' is of a conventional type well known in the art and both are adapted to oscillate at some one common frequency between 2000 and 3000 cycles. The output of oscillator T is fed by wires 20 and 21 through an interrupting device 22 which will be described in further detail later, and thence by wire 23 through a coupling coil 24. This coil is wound on an iron core 25 of suitably laminated construction having a hinged leg 26. Leg 26 is capable of being opened to permit core 25 being disposed around pipe 18. Connected in shunt to coil 24 is a condenser 30. By choosing a proper value for the inductance and capacity of coils 24 and condenser 30, the maximum transfer of signal energy to pipe 18 may be effected.

Referring to the interrupter device 22, output lead 21 is connected to a pivoted contact arm 33 carrying a movable contact 34 cooperating with a fixed contact 35 which is connected to lead 23. A spring 36 coupled to arm 33 is adapted to maintain the contacts in cooperating closed position. Arm 33 carries a tip 40 which bears against a cam roller 41 of a circular outline but having a flat portion 42. As is clearly evident in Figure 2, when tip 40 bears on flat 42 of cam 41, the contacts are closed, and otherwise the contacts are opened. Cam 41 is driven by a motor 45. Where practical, motor 45 is preferably of the synchronous alternating current type used in alternating current electric clocks and is thus adapted to drive cam 41 at a substantially constant speed. Oscillator T' is similarly connected by lead 120 and 121 through interrupting device 122 and lead 123 to an inductance coil 124 suitably disposed around a laminated core 125. This core also has one leg hinged at 126 for coupling with pipe 14. A condenser 130 is disposed across inductance 124 for tuning purposes. Pivoted arm 133 carries contact 134 cooperating with contact 135, and has a spring 136 tending to press a tip 140 of the arm down against flat 142 of cam roller 141. Motor 145 is similar to motor 45. By rotating cam 142 faster than cam 42 as by different gear ratios, cam 42 may be driven at about 50 R. P. M. and cam 142 about 250 R. P. M. Hence the dot characteristics are exaggerated.

The pick-up coil 50 may be disposed in any suitable insulating frame 51 provided with a handle 52 and a rest 53. The pick-up coil 50 is wound in flat pancake fashion and is provided with two end terminals 55 and 56 and a middle terminal 57.

The two terminals 55 and 56 are connected to the opposite plates of a small condenser 59. A lead 60 goes from terminal 56 to the grid 61 of a vacuum tube 62. Cathode 64 is connected by a pair of leads 65 and 66 to cathode supply lines 67 and 68. Line 68 is connected through an A battery 69 to a ground 70. Line 67 is connected through a bias resistor 71 to grounded lead 72 which continues on to the center terminal 57 of the pick-up coil. The anode 75 of tube 62 is connected through line 76 to the primary 77 of a transformer whose other terminal is connected by line 78 to the positive terminal of a B battery 79. The negative terminal of the B battery is connected by a line 80 through grounded junctions 81 and 82 and thence by line 83 to a junction 84. From point 84 a wire 85 leads to the secondary 86 tuned by a condenser 87 in parallel thereto and connected by lead 88 to grid 90 of an amplifier 91. Filament 92 is connected by suitable leads 93 and 94 to supply leads 67 and 68. Anode 95 is connected by lead 96 to the primary 97 of a second transformer whose lower terminal is connected by lead 98 to a wire 99 leading back to wire 78 in the plate supply circuit. Secondary 100 is shunted by a tuning condenser 101 and is connected by lead 102 back to line 83. Wire 105 leads from secondary 100 to grid 106 of a second amplifier 107 whose filament 108 is connected by wires 109 and 110 back to filament supply wires 67 and 68. The anode 112 is connected by wire 113 to the primary 114 of the output transformer the other terminal of which is connected by wire 115 back to the plate supply line 99. Secondary 120 of the transformer is connected to a pair of headphones 121 or any other suitable indicating means.

Referring to Figure 4, which is the preferred form, an oscillator has its output connected to wires 225 and 226. Wire 225 is connected through spring 227 to a switch arm 228 pivoted at 229. Arm 228 has one end 230 as a cam follower while the other end 231 plays between stationary contacts 232 and 233. Cam follower end 230 is spring pressed against cam 235 having a fall 236. This cam is driven by a motor M at a slow speed of the order of one or two revolutions per minute.

Contact 232 is connected by wire 237 to coil 238 of coupling inductance 239 having a hinged arm 240 as part of the core. The return from coil 238 is made by wire 242 back to junction 243 and thence by wire 244 back to the oscillator. Contact 233 is connected by wire 246 to coil 247 of coupling inductance 248. The core is provided with a hinged section 249. Coil 247 has a return 250 to junction 243. Both coils 238 and 247 are preferably shunted by condensers 252 and 253 for tuning.

The oscillator, operating continuously, alternately supplies energy to coils 238 and 247 for unequal periods of time whose relative values is determined by the angular extent of the fall 236 of the cam. In this particular instance, the ratio is 1 to 4. It is clear that the cyclic energization can be applied to more than two coils and is only limited by the ability of an operator to distinguish one signal from the remaining.

It frequently happens that one pipe system is so much more conductive than the other that both signal oscillations tend to follow that one system even though originating in different systems. Thus, in the case where the oscillations remain on their own system, the signals heard by the operator may be represented by Figure 5. In that case, the dot impulses in coil 138 are at one energy level and the dash impulses are at a different energy level. If the pipe system upon which the dots are impressed is being traced, then the dash signals may be faintly heard or not even heard at all.

However, as shown in Figures 6 and 7, it frequently occurs that both signals are at energy levels very close to each other. In Figure 6, the dot pipe system is being traced and has the dot signals at slightly greater volume than dash signals. This may be due to dash signals impressed on a gas pipe coming over to the better conducting water pipe. In that case, the dash signals will form a background of continuous noise at the frequency of the oscillator punctuated at periodic intervals by dot increases of the background noise. In Figure 7, the reverse is true and the undesired signal—dot in this case— represents a decrease in the volume of the signal. Obviously, the sound level in one pipe system of both sets of signals will always differ in some degree since one signal originates on the system and the other signal comes to it from a higher resistance path. A difference as little as 10% in the sound energies of the two signals suffices for discrimination.

The entire system in general operates upon the principle that the pipe system with grounds forms a closed secondary circuit in which currents are induced by the coupling coil as a transformer primary. The pick-up coil has alternating potentials induced therein by electromagnetic coupling. The ohmic resistance of the pipe itself is much lower than the resistance of the surrounding soil so that the signals follow the pipe systems gradually feeding off into the soil. For this reason it is desirable to feed the energy into the pipe efficiently. I have found that the form of coupling unit together with the rest of the system operates to do this in a highly desirable manner.

The path of maximum radiation represented by maximum volume of the desired signal is sufficiently accurate to plot out a pipe system in an ordinary city street with great accuracy. In practice, the signals travel for several blocks in a manner susceptible of discrimination. Preferably the frequency is maintained at a stable value and everything tuned as sharply as possible. Thus, the receiver is preferably designed to pass a narrow band including the oscillator frequency. Obviously, signal responsive means of other type than telephone receivers may be used if desired.

By utilizing variations in energy levels for sensible time periods only one definite frequency is necessary for an oscillator and receiver. Hence an extremely sharp band may be used. This is in distinction to a signal frequency modulating the oscillator frequency in which case the band of frequencies would have to be transmitted and received.

What is claimed is:

1. The method of tracing one of a plurality of conducting interlaced pipe systems which comprises impressing upon each pipe system electrical oscillations of a substantially identical audio frequency and at substantially uniform energy levels, cyclically changing each energy level to a different uniform energy level with each energy level being maintained for a discernible time period to generate signal impulses with the impulses on one pipe system different than the other impulses, and following the line of maximum radiation of the desired signal impulses corresponding to a desired pipe system.

2. The method of tracing one of a plurality of conducting interlaced pipe systems which comprises impressing upon each pipe system electrical oscillations of substantially the same frequency of the order of 5000 cycles or less and at substantially uniform energy levels, cyclically changing each energy level to a different uniform energy level with each energy level being maintained for a discernible time period to generate signal impulses with the impulses on one pipe system different than the other impulses, and tracing the line of maximum radiation of oscillations having a predetermined signal impulse.

3. The method of tracing one of a plurality of conducting interlaced pipe systems which comprises impressing upon each pipe system electrical oscillations of substantially the same audio frequency, interrupting the oscillations for each pipe system at time intervals to generate signal impulses, the signal impulses of one system being distinguishable from those of the other systems, and tracing the path of maximum intensity of radiation of desired signals.

4. In a signal system for tracing one of a plurality of conducting interlaced pipe systems comprising at least one source of audio frequency oscillations at a substantially uniform energy level, means for cyclically changing said energy level to a different uniform value with each energy level being maintained for a discernible time period to generate signal impulses, the signal impulses of one pipe system being different from that of the remaining pipe systems, and portable means for receiving the radiated signals, said means being responsive to variations in signal strength whereby a desired pipe system may be traced out.

5. In a signaling system for tracing one of a plurality of conducting interlaced pipe systems comprising means for impressing electrical oscillations of the order of 3000 cycles upon all of the pipe systems, the frequency for all of the pipe systems being substantially the same and at substantially uniform energy levels, means for cyclically changing each energy level to a different uniform level with each energy level being maintained for a discernible time priod to generate signal impulses, the signal impulses for one pipe system being different from that of the remaining pipe systems, and portable signal receiving means responsive to the radiated signals.

6. In a signaling system for tracing one of a plurality of conducting interlaced pipe systems comprising separate means for impressing electrical oscillations of an audio frequency upon each pipe system, the frequency of all the systems being substantially the same, means for modulating each series of oscillations with signal impulses, the signal impulses of one series being distinguishable from those of the remaining series, and portable means for receiving said oscillations whereby an operator may trace out a desired pipe system by following the line of maximum radiation of a pipe system having desired signal impulses.

7. The system of claim 6 wherein said signal receiving means includes an amplifier sharply tuned to the oscillations impressed upon all the pipe systems.

8. The system of claim 6 wherein said signal receiving means includes a pick-up coil having a center tap and two terminals and wherein the center tap is grounded to the signal receiving means.

9. The system of claim 6 wherein each pipe system has an iron core adapted to be clamped around a portion of the pipe system with a coil for said core carrying the oscillations.

10. In a system for tracing one of two interlaced conducting pipe systems, the combination of an oscillator, means for impressing the output of said oscillator alternately upon each one of said pipe systems at predetermined time intervals and for a predetermined time to determine separate discernible signal impulses, and means for picking up the radiation from one or both systems.

11. In a system for tracing one of a plurality of conductive pipe systems, an audio-frequency oscillator, means for impressing the output of said oscillator alternately on each of said pipe systems for different time intervals, and means for picking up the radiated signal oscillations.

12. In a system for tracing one of a plurality of conducting pipe systems, an oscillator, switching means for coupling said oscillator to one pipe system at a time, means for cyclically operating said switching mechanism to impress upon each pipe system the signal impulse for a discernible time interval, and means for picking up the radiated signal impulses said means being responsive to the intensity thereof for tracing the desired pipe system.

13. In a signal system, an oscillator having an output of between 2000 and 3000 cycles per second, a coupling unit adapted to be disposed around each pipe of a plurality of interlaced conducting pipe systems, means for impressing the output of said oscillator exclusively on one coupling unit at a time at regular intervals whose length varies with the pipe system, the intervals on the same system being the same, and means for picking up the signal impulses radiated and said means being responsive to the intensity thereof for tracing out said system.

14. In a signaling system, an oscillator, a pair of coupling coils each adapted to be disposed around a pipe in separate but interlaced conducting pipe systems, switching means for alternately coupling said oscillator to said coupling coils at unequal time intervals, and signal responsive means for picking up the radiated oscillations of a desired pipe system by tracing the line of maximum radiation.

15. A signaling system for distinguishing one of two interlaced conducting pipe systems comprising an oscillator having an output at a frequency of between 2000 and 3000 cycles per second, a coupling unit for each pipe system and adapted to be fed by the oscillator and impress said oscillations on the respective pipe systems, continuous means for cyclically impressing the output of said oscillator upon each of said coupling units alternately for unequal time intervals, and signal responsive means for picking up the radiation from the pipe systems and tracing the desired pipe by means of a line of maximum radiation.

16. The method of signaling which comprises impressing upon separate but interlaced conducting pipe systems signal impulses at the same frequency alternately from unequal intervals of time, and tracing the line of maximum rediation of the impulses corresponding to the desired pipe system.

EDWARD H. YONKERS, Jr.